US012675519B1

(12) United States Patent
Fulford et al.

(10) Patent No.: US 12,675,519 B1
(45) Date of Patent: Jul. 7, 2026

(54) SUMMARIZING CONTEXT AND CONDITIONING A LARGE LANGUAGE MODEL TO GENERATE RESPONSES BASED ON SUMMARIZED CONTEXT

(71) Applicant: OpenAI OpCo, LLC, San Francisco, CA (US)

(72) Inventors: Isabella Fulford, San Francisco, CA (US); Giambattista Parascandolo, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/300,181

(22) Filed: Aug. 14, 2025

(51) Int. Cl.
G06F 16/34          (2019.01)
G06F 16/334        (2025.01)

(52) U.S. Cl.
CPC .......... G06F 16/345 (2019.01); G06F 16/334 (2019.01)

(58) Field of Classification Search
None
See application file for complete search history.

(56) References Cited

U.S. PATENT DOCUMENTS

| | | | | |
|---|---|---|---|---|
| 9,299,342 | B2 * | 3/2016 | Chang ............... | G06F 16/24575 |
| 12,197,865 | B2 * | 1/2025 | Thoniparambil ..... | G06F 40/289 |
| 2022/0391591 | A1 * | 12/2022 | Ronen ................... | G06F 16/345 |
| 2024/0395246 | A1 * | 11/2024 | Mcquinn ............... | G06N 3/084 |
| 2025/0063140 | A1 * | 2/2025 | Grillo .................... | G06F 40/30 |
| 2025/0147973 | A1 * | 5/2025 | Yu ........................ | G06F 16/3347 |
| 2025/0148219 | A1 * | 5/2025 | Jauhar ................... | G06F 16/288 |
| 2025/0258847 | A1 * | 8/2025 | Muschett ............ | G06F 16/3326 |
| 2025/0265413 | A1 * | 8/2025 | Hernandez ............ | G06F 40/174 |
| 2025/0284721 | A1 * | 9/2025 | Agrawal ............. | G06F 16/3329 |
| 2025/0284725 | A1 * | 9/2025 | Cantrell .................. | G06F 40/56 |

FOREIGN PATENT DOCUMENTS

WO          WO-2024118197 A1 *   6/2024   .......... G06Q 10/063

OTHER PUBLICATIONS

Thamid Rhaman Laskar et al. Query-OPT: Optimizing Inference of Large Language Models via Multi-Query Instructions in Meeting Summarization, Oct. 20, 2024 (Year: 2024).*

* cited by examiner

*Primary Examiner* — Howard Cortes
(74) *Attorney, Agent, or Firm* — Keller Preece PLLC

(57)          ABSTRACT

The present disclosure relates to systems, non-transitory computer-readable media, and methods for reducing context size for a large language model (LLM) by generating context summaries. In particular, the present disclosure reduces context size and improves the accuracy of existing LLMs by generating and storing context summaries. In particular, the disclosed systems utilize an LLM to determine what context to summarize and when to summarize the context as a conversation progresses. The disclosed systems further update model context to include context summaries instead of full session transcripts or model reasoning. Furthermore, in some implementations, the disclosed systems can use a re-materialization prompt to trigger the LLM to recall particular portions of session transcripts or model reasoning to condition the LLM. Thus, the system can use context summaries to fill context windows for informing LLM response generation as opposed to storing memory-intensive conversation transcripts and model reasoning.

20 Claims, 13 Drawing Sheets

Linear Table Index <u>502</u>

| Index | Context Summary | Session Transcript |
|---|---|---|
| 0 | User: Possible Sequels For Movie | User: ——— |
| 1 | LLM: 5 Sequel Ideas | LLM: ——— |
| 2 | User: Write A Short Story | User: ——— |
| 3 | LLM: Short Story About A Cat | LLM: ——— |

Tree-Based Hierarchical Structure <u>504</u>

700

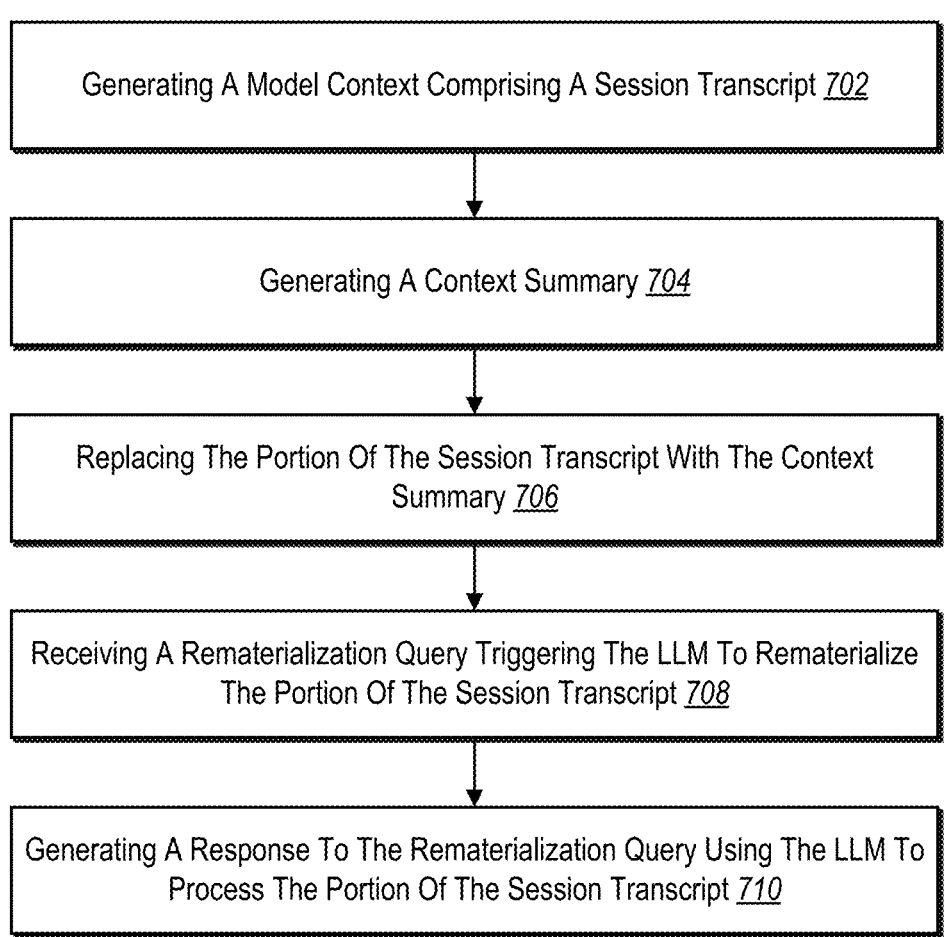

Generating A Model Context Comprising A Session Transcript 702

Generating A Context Summary 704

Replacing The Portion Of The Session Transcript With The Context Summary 706

Receiving A Rematerialization Query Triggering The LLM To Rematerialize The Portion Of The Session Transcript 708

Generating A Response To The Rematerialization Query Using The LLM To Process The Portion Of The Session Transcript 710

SUMMARIZING CONTEXT AND CONDITIONING A LARGE LANGUAGE MODEL TO GENERATE RESPONSES BASED ON SUMMARIZED CONTEXT

BACKGROUND

Recent years have seen significant development in training and utilizing machine learning models. More specifically, advancements in large language models (LLMs) allow LLMs to engage with users in natural dialogue. The advancement of computer applications has expanded the working memories or context windows of existing LLMs. Context windows determine the maximum amount of information that an LLM can take as input for a query. Recent developments in LLMs have increased context lengths, enabling larger inputs and consequently applications of the LLM to more use cases. For instance, LLMs with larger context windows can process larger documents, databases, and even information from multiple data sources. Furthermore, LLMs maintain context in iterative conversations by remembering previous interactions and building on previous prompts and responses. While many existing LLM management systems have introduced basic mechanisms for managing and accessing context, existing systems face some technical shortcomings in organizing and storing context.

Many existing LLM management systems are inefficient, inaccurate, and inflexible. More specifically, existing LLM management systems can be inefficient because they often rely on simplistic or reactive context management strategies that expend compute and storage resources. For example, existing systems typically treat all content equally when context window limits have been crossed. To illustrate, existing systems often lack mechanisms for evaluating token value, forcing LLMs to expend context window storage space and computing power to store and process low-value tokens through every generation step. When faced with limited context window space, existing LLM management systems often arbitrarily delete context or re-evaluate data within context windows. Such re-evaluations can involve re-embedding large amounts of data, recalculating relevance scores, and other operations that increase latency and compute overhead.

Additionally, existing LLM management systems can be inaccurate because they often arbitrarily delete context without regard to semantic importance. When a context window is full, many LLM management strategies rely on simplistic rules, for example, truncating the oldest messages, deleting model reasoning, or removing context based on token count. This type of approach often leads to the loss of critical details. As a result, the LLM may generate responses that are incomplete, inconsistent, or misaligned with prior context. Because many existing LLM management systems often treat all context as equally expendable, they degrade accuracy in LLM tasks requiring long-term continuity.

Furthermore, existing LLM management systems are often inflexible because they silo context between conversations due to memory limitations. Because most existing LLMs are limited to operate within context windows, many LLMs treat interactions as largely independent. For instance, once one conversation ends, many LLM management systems discard or separately store prior conversations with users and model reasoning. As a result, many LLM management systems cannot fluidly carry forward relevant history, past reasoning, user preferences, or long-term goals across conversations. Such limitations can lead to inconsistent behavior and impairs the ability of existing systems to build coherent, context-rich interactions over time and across conversations.

SUMMARY

One or more embodiments described herein provide benefits and/or solve one or more problems in the art with systems, methods, and non-transitory computer readable storage media that utilize a large language model to decide what context to summarize and when to summarize it. The context management system can generate a context summary based on a portion of a session transcript and/or model reasoning. The context management can include the context summary instead of the portion of the session transcript or the model reasoning within the context window to preserve space within the context window. The context management system can further use the LLM to generate responses based on the context summary within the context window. Additionally, or alternatively, the context management system receives a rematerialization query that triggers the large language model to modify data within the context window to include the portion of the session transcript and/or the model reasoning. As a result, the context management system can use the LLM to generate a response to the rematerialization query using the LLM to process the portion of the session transcript and/or the model reasoning rematerialized from the context summary.

BRIEF DESCRIPTION OF THE DRAWINGS

The detailed description provides one or more embodiments with additional specificity and detail through the use of the accompanying drawings, as briefly described below.

FIG. 7 illustrates an example series of acts for generating a response to a rematerialization query using an LLM to process a portion of a session transcript in accordance with one or more embodiments of the present disclosure.

DETAILED DESCRIPTION

Figure 1:
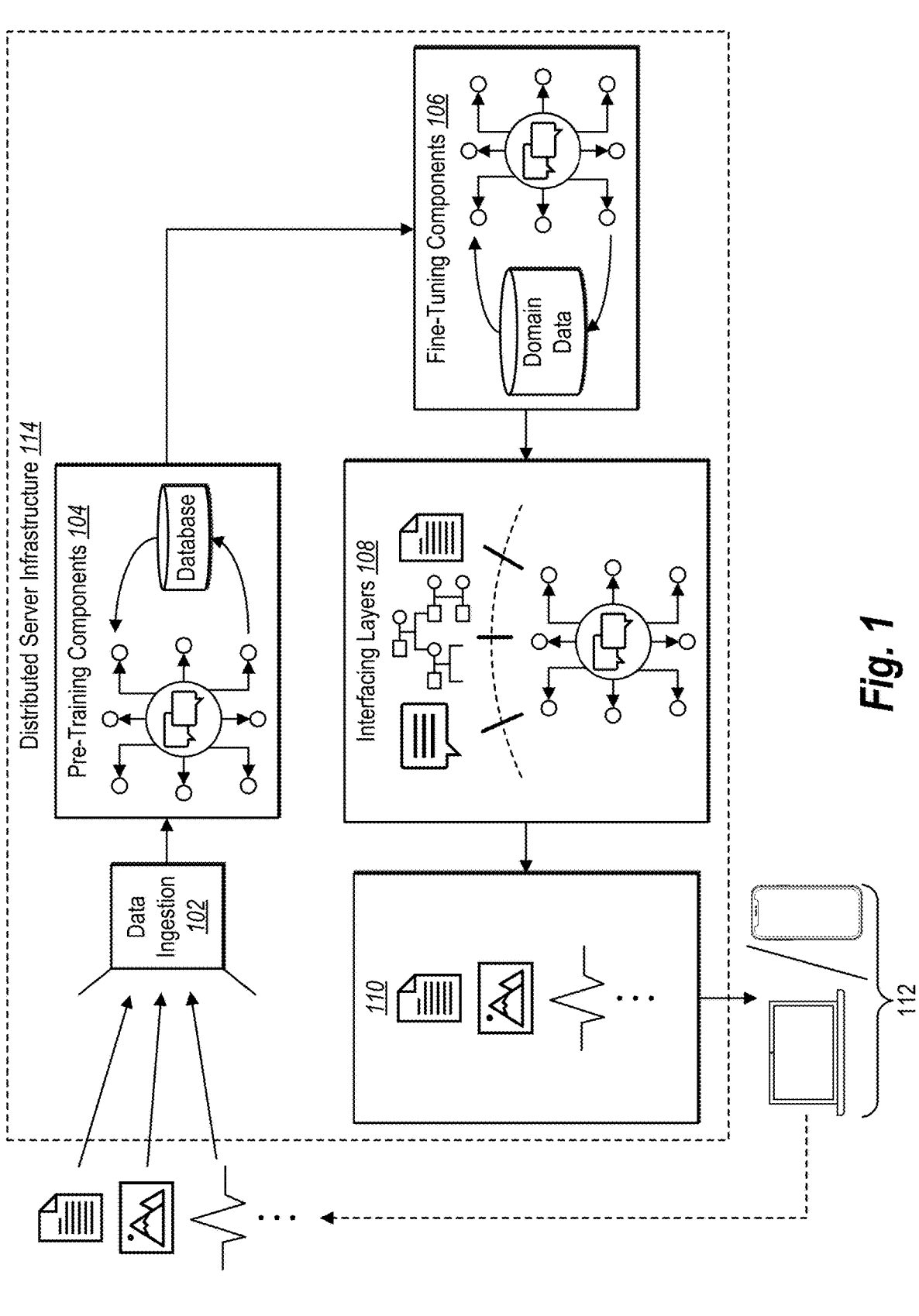
FIG. 1 illustrates a high-level architecture of a generative artificial intelligence system for implementing large language models and other generative models in accordance with one or more embodiments of the present disclosure.

This disclosure describes embodiments of a context management system that utilizes an LLM to intelligently decide what and when to summarize context. For example, the context management system can summarize context from a session transcript or model reasoning. The context management system can further utilize the LLM to determine when to rematerialize portions of the session transcript to generate responses. FIG. 1 illustrates a high-level architecture of a generative artificial intelligence ("AI") system 100 for implementing large language models and other generative models to enable natural language processing, conversational interfaces, multimodal content generation, and analysis. The generative AI system 100 may include data ingestion pipelines 102, pre-training components 104, fine-tuning components 106, interfacing layers 108, and supporting hardware in the form of a distributed server infrastructure 114.

As used herein, the term "generative model" refers to a machine learning model that is configured to generate new data samples that are statistically consistent with the data on which the model was trained. Generative models may include, but are not limited to, large language models, diffusion models, variational autoencoders, generative adversarial networks, and multimodal transformer models. Generative models may be configured to generate outputs across various modalities, including text, images, audio, and video, either independently or conditionally based on input data from the same or a different modality. For example, a generative model may generate an image based on a textual prompt, generate speech based on textual input, or generate text based on prior conversational context, and may operate using probabilistic or iterative denoising methods to produce high-quality, contextually appropriate outputs.

As used herein, the term "large language model" (or "LLM") refers to a computational model configured to process and generate human-readable text by learning statistical and contextual relationships within natural language data using machine learning techniques. An LLM typically comprises a deep neural network architecture, such as a transformer-based architecture with multiple layers and attention mechanisms, and is trained on large corpora of text using objectives such as masked language modeling, causal language modeling, or autoregressive prediction. The LLM may include billions or trillions of parameters and is capable of performing a variety of language tasks, including but not limited to text generation, summarization, translation, and question answering, by generating outputs based on input prompts in a contextually relevant manner.

Relatedly, the term "machine learning model" refers to a computational construct comprising one or more algorithms and associated parameters that are configured to perform tasks by identifying patterns or relationships within data. A machine learning model may be trained using supervised, unsupervised, semi-supervised, or reinforcement learning techniques, where the model parameters are adjusted based on input data to minimize a loss function or maximize a reward signal. The machine learning model may include, but is not limited to, neural networks (e.g., convolutional neural networks, recurrent neural networks, transformer models), decision trees, support vector machines, or ensemble models, and may be configured to perform tasks such as classification, regression, clustering, anomaly detection, or data generation. A machine learning model may operate on structured, unstructured, or multimodal data and may generate outputs that are used for predictions, decisions, or content generation based on learned representations of input data.

Additionally, the term "neural network" refers to a computational model comprising multiple interconnected processing elements, often referred to as neurons or nodes, that are organized into layers including an input layer, one or more hidden layers, and an output layer. Each neuron in the neural network applies a transformation, which may include a weighted sum of inputs followed by a non-linear activation function, to produce an output that is transmitted to subsequent neurons in the network. Neural networks are configured to learn representations of data by adjusting the weights and biases of the connections between neurons during a training process that minimizes a loss function. The neural network may include various architectures, including but not limited to feedforward neural networks, convolutional neural networks (CNNs), recurrent neural networks (RNNs), and transformer-based networks (e.g., LLMs), and may be utilized for tasks such as classification, regression, pattern recognition, natural language processing, and generative modeling across structured, unstructured, or multimodal data.

The data ingestion pipelines 102 of the generative AI system 100 may receive and preprocess large volumes of structured and unstructured data, including text corpora, image datasets, video datasets, and audio datasets, to support diverse generative model training. Preprocessing may include deduplication, tokenization, normalization, feature extraction (e.g., spectrogram generation for audio), and content safety filtering, preparing data for effective distributed training across server devices.

The pre-training components 104 of the generative AI system 100 may utilize transformer-based architectures for LLMs, as well as additional generative models such as diffusion models for image generation, autoencoders for representation learning, and multimodal transformer models for cross-domain generation tasks. These models may be configured with deep neural network stacks to capture hierarchical, semantic, and contextual relationships within the data.

The generative AI system 100 may employ diffusion models for image and video generation, where the models learn to iteratively denoise random noise into structured outputs conditioned on textual or other modality inputs. The generative AI system 100 may train these models using score-based or denoising diffusion probabilistic methods across distributed server devices within the distributed server infrastructure 114.

The generative AI system 100 may also implement speech generation models, including text-to-speech (TTS) systems using autoregressive or non-autoregressive architectures, and audio diffusion models capable of generating high-fidelity waveforms conditioned on linguistic and prosodic features. Feature extraction components may preprocess audio data to create Mel-spectrograms or other representations used during model training using the pre-training components 104.

Specialty server devices within the generative AI system 100, such as those of the distributed server infrastructure 114, may include GPUs, TPUs, or custom AI accelerators designed for high-throughput operations supporting both transformer and diffusion model training. These servers may differ from ordinary servers by incorporating high-bandwidth memory (HBM), advanced interconnects (e.g., NVLink, PCIe Gen5), and thermal and power management systems optimized for large-scale generative model workloads.

The generative AI system 100 may store shard-specific checkpoints, intermediate latents, and optimizer states for large-scale diffusion models, LLMs, and multimodal models on high-speed local or network-attached storage within the specialty servers, enabling resumption of training and inference jobs after interruptions or updates.

The fine-tuning components 106 of the generative AI system 100 may adapt generative models to specific user tasks or domain tasks, such as personalized content generation, domain-specific summarization, image style transfer, or voice cloning. Fine-tuning may involve supervised fine-tuning on task-specific datasets and reinforcement learning with human feedback (RLHF) where applicable, with data and gradients distributed across server devices for scalable operation.

The interfacing layers 108 of the generative AI system 100 may handle user prompts for LLM-based text generation, text-to-image generation requests, and speech synthesis requests. The system may tokenize or encode user prompts, generate conditioning latents where applicable (e.g., CLIP embeddings for image generation), and distribute inference tasks across server clusters for each modality-specific generative model. The interfacing layers 108 may include computer scripts, subroutines, or integrated tools for processing prompts, implementing models, and/or performing API calls to supplement and/or augment generative functions of LLMs and other models of the generative AI system 100. In some embodiments, the interfacing layers 108 include databases for accessing stored content (e.g., a vector database of content vectors for comparing with prompt vectors or query vectors) for contextual augmentation of model operation (e.g., for retrieval-augmented generation and its analogs). In some embodiments, the interfacing layers 108 integrate functionality from third-party systems (e.g., external to the generative AI system 100 and/or the distributed server infrastructure 114) into the generative AI system 100 using APIs and/or particular communication protocols to interact with generative model data (e.g., to execute generated code).

As illustrated in FIG. 1, the generative AI system 100 generates generative output 110. The generative AI system 100 can generate the generative output 110 in the form of text responses, images, videos, audio clips, or other multimodal digital content. The generative AI system 100 can generate the generative output 110 using the interfacing layers 108 in conjunction with one or more trained (e.g., pre-trained and fine-tuned, using the described components) generative models, including LLMs and others described herein.

In some embodiments, the generative AI system 100 generates the generative output 110 over one or more conversational interactions or turns with client device(s) 112. Indeed, the generative AI system 100 can provide the generative output 110 for display on the client device(s) 112. In addition, the generative AI system 100 can receive additional input in the form of text-based queries or prompts, images, videos, audio clips, and/or other multimodal content as part of an ongoing conversation between the generative AI system 100 and the client device(s) 112 and/or as part of a new conversation or instantiation of the generative AI system 100.

For large generative models exceeding single-device memory, the generative AI system 100 may implement model parallelism, with different server devices processing partitions of the model during inference across the distributed server infrastructure 114, and may use activation checkpointing and memory recomputation strategies to handle resource constraints efficiently across distributed modalities.

Server devices within the generative AI system 100 may utilize high-bandwidth interconnects for low-latency tensor and latent exchange during multi-stage generation processes (e.g., latent generation followed by decoding in diffusion models). This enables the generative AI system 100 to support complex, multi-step generation tasks, such as generating text and subsequently generating images conditioned on the generated text, while maintaining low latency.

The distributed server infrastructure 114 of the generative AI system 100 may include compute clusters with racks of specialty servers interconnected with high-bandwidth networking technologies such as InfiniBand, RDMA-enabled Ethernet, or custom fabrics, and distributed storage using NVMe over Fabrics (NVMe-oF) for rapid access to large model weights, intermediate outputs, and context data during inference.

The distributed server infrastructure 114 can include safety filtering and content moderation layers that operate in parallel with inference pipelines across modalities, applying token-level filtering for LLM outputs, image or video classification for generated visual content, and audio analysis for speech outputs to ensure outputs comply with operational policies and applicable regulations.

The distributed server infrastructure 114 can include orchestration and resource management layers that dynamically allocate compute, memory, and network resources across modalities, scaling generative model training and inference in response to user demand and system load while monitoring resource health across components of the generative AI system 100.

Collectively, the architecture illustrated in FIG. 1 enables the generative AI system 100 to provide scalable, efficient, and safe generative model services across text, image, video, audio, and other modalities, leveraging specialty server devices and distributed computing for high-throughput training, fine-tuning, and inference across a wide variety of generative AI applications.

Figure 2A:
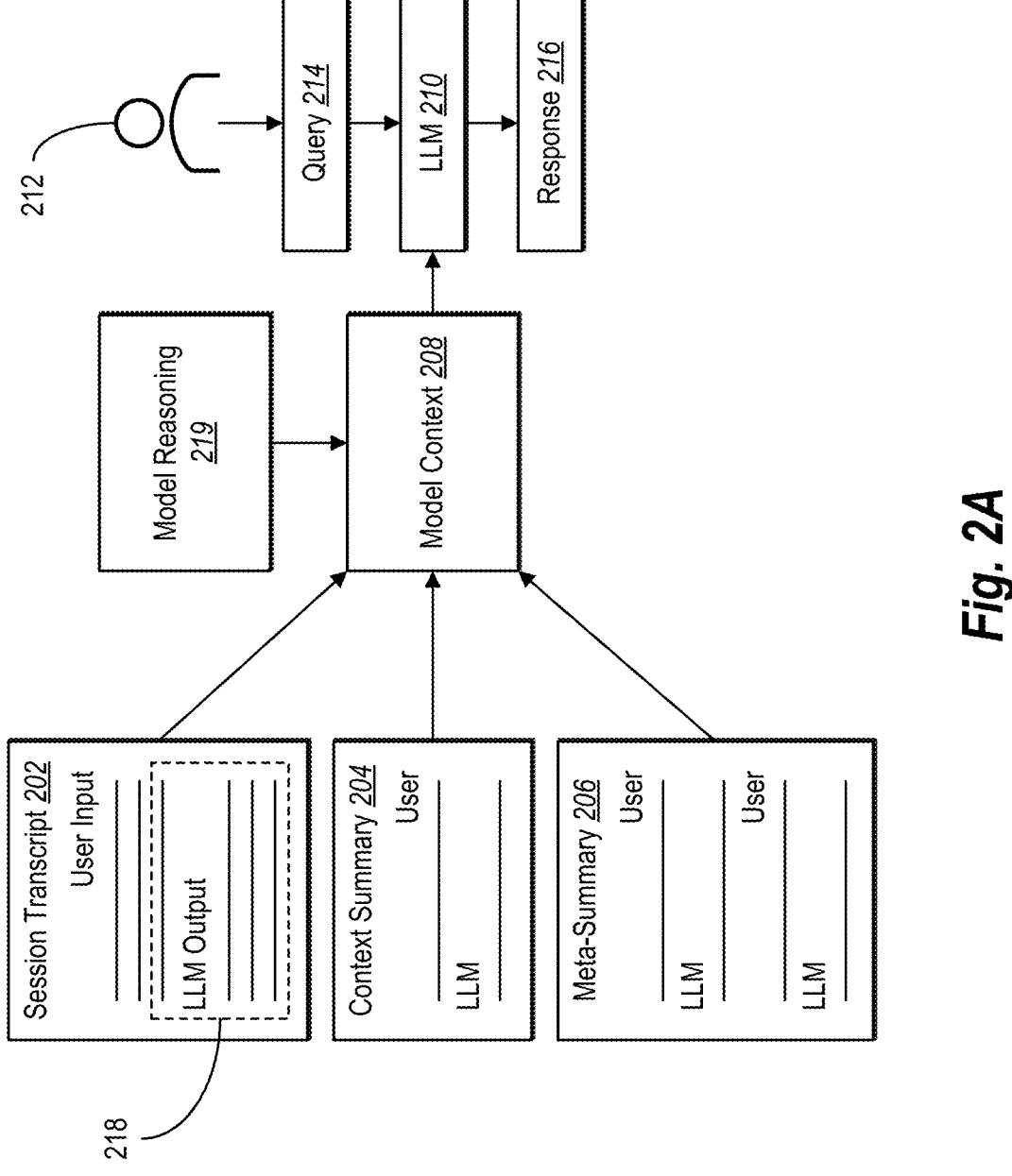
FIGS. 2A-2B illustrates the context management system generating a model context in accordance with one or more embodiments of the present disclosure.
Figure 2B:
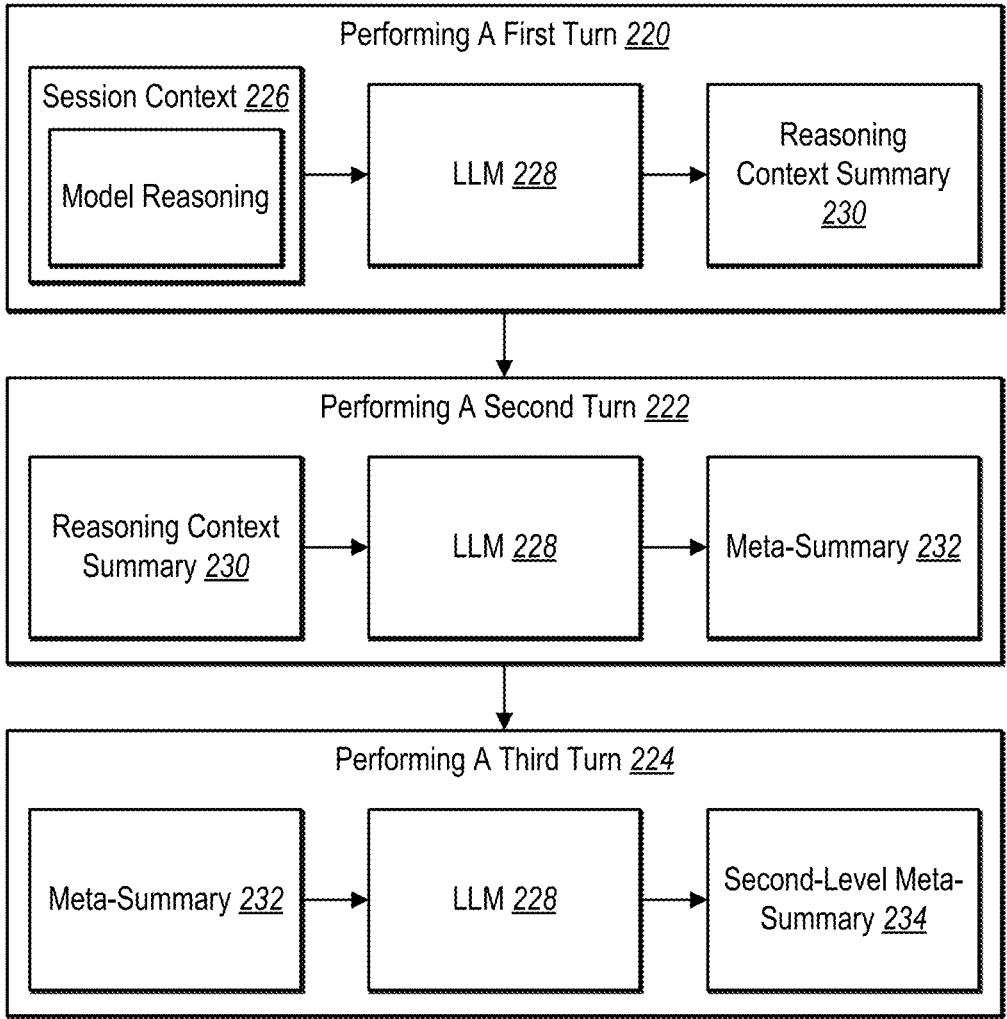

As mentioned, LLMs are often limited in the amount of information they can process in a single prompt. FIGS. 2A-2B illustrate a context management system 120 (described in additional detail below in the description accompanying FIG. 8) using an LLM 210 to process different types of information within a model context in accordance with one or more embodiments.

FIGS. 2A-2B illustrate the context management system 120 (shown also in FIG. 8) generating a model context 208 in accordance with one or more embodiments. As used herein, the term "model context" refers to data that an LLM can process to generate a response. More specifically, the model context comprises data that informs the LLM's output. In one or more embodiments, a model context comprises the LLM's working memory or data that the LLM can reason over during a single inference pass. In some examples, model context can include a user prompt or query, previous dialogue turns within a session, system instructions, model reasoning, retrieved documents, and other data included in the input stream. Relatedly, as used herein, the term "context window" refers to a technical limit that defines how much of the model context that the LLM can process at once. For example, a context window can be measured in tokens (e.g., 4k, 32k, or 128k tokens). The context window defines the boundary in which the model context must fit. In some examples, if the model context exceeds the context window, the context management system must truncate, summarize, or selectively include portions of the model context.

For instance, and as shown in FIG. 2A, the context management system 120 can generate the model context 208 comprising a session transcript 202. As used herein, the term "session transcript" comprises a record of an interaction between a user and an LLM. In particular, a session transcript comprises a full interaction between the user and the LLM during a single session. The session transcript captures the sequence of messages exchanged. Messages within an ongoing session comprise user prompts and LLM responses. In some examples, the session transcript further comprises metadata such as timestamps, message IDs, flags indicating task boundaries, clarifications, or retrieved content. For example, a session transcript can comprise a full record of user prompts and the LLM's responses.

In some examples, only part of a session transcript can fit within a context window. For instance, and as illustrated in FIG. 2A, the session transcript 202 can include a segment 218 such that the model context fits within a context window if the session transcript 202 becomes too large. As mentioned, some existing systems have a context window of a fixed size (e.g., 4k or 32k tokens). As the session transcript 202 grows, the session transcript 202 can exceed the limit of the context window. As a result, some existing systems input a limited segment 218 of the session transcript 202 into the model context such that the model context fits within the context window.

As mentioned, the context management system 120 can generate a context summary 204 summarizing a portion of the session transcript 202 for conditioning the LLM 210. As used herein, the term "portion of a session transcript" refers to a part of a session transcript. In particular, a portion of a session transcript refers to a contiguous segment of a session transcript between a user and an LLM. A portion of a session transcript can be defined by content (e.g., a task-specific exchange), time, message count, or other constraints. For example, a portion of a session transcript can comprise an exchange comprising one user query and the corresponding LLM response. In another example, a portion of a session transcript comprises a total of six messages or three exchanges between the user and the LLM.

As further shown in FIG. 2A, the context management system 120 can include model reasoning 219 within the model context 208. As used herein, the term "model reasoning" refers to autonomous processing a LLM performs. In particular, model reasoning refers reasoning that an LLM performs to interpret input and generate responses. For example, model reasoning comprises explicit reasoning such as step-by-step explanations or internal dialogue (e.g., chain-of-thought or self queries). Additionally, in some examples, model reasoning includes implicit reasoning in which the LLM draws conclusions through its learned internal representations without showing intermediate steps. In some implementations, the context management system 120 processes model reasoning the same way as it processes portions of session transcript a described in this disclosure.

FIG. 2A illustrates the context management system 120 generating a context summary 204. As used herein, the term "context summary" refers to a condensed version of a portion of a session transcript or a condensed version of a portion of model reasoning. In particular, a context summary comprises a lightweight stand-in for full transcript or model reasoning content. For example, rather than preserving every word, a context summary distills key points required for an LLM to maintain continuity during an ongoing session. For example, a context summary can comprise a condensed version of a user query, LLM response, and/or an exchange. In another example, the context summary 204 represents a condensed version of a portion of model reasoning and summarizes how an LLM interpreted a task, followed intermediate steps, or justified its responses.

As shown in FIG. 2A, the context management system 120 can modify the model context 208 to include context summary 204 instead of the session transcript 202 or the model reasoning 219. More specifically, in some implementations, the context management system 120 generates a context summary based on a portion of the session transcript. The context management system 120 can remove the portion of the session transcript from the model context 208 and insert the context summary 204. As a result, the context management system 120 reduces the number of tokens input into the LLM 210. In another example, the context management system 120 replaces the model reasoning 219 (or a portion of the model reasoning 219) within the model context 208 with the context summary 204 summarizing the corresponding model reasoning.

Furthermore, in some implementations, the context management system 120 can use the LLM 210 to generate a meta-summary 206. As used herein, the term meta-summary comprises a higher-level summary that synthesizes one or more context summaries into a coherent overview. In particular, a meta-summary can abstract across context summaries to highlight essential themes represented across context summaries. For example, a meta-summary can comprise a summary of multiple user queries and multiple LLM responses. In another example, a meta-summary comprises a summary of several rounds of model reasoning. In some examples, the term "meta-summary" can be used recursively to describe a summary of meta-summaries. For example, the term "meta-summary" serves as a condensed abstraction over multiple layers of summarization, such as meta-meta-summaries or deeper summary hierarchies.

The context management system 120 can update the model context 208 to include the meta-summary 206 and remove the corresponding context summary 204. As will be discussed in additional detail below with respect to FIGS. 3A-3B, the context management system 120 can rematerialize portions of the session transcript 202 or the model reasoning 219 based on determining that additional information is needed for the LLM 210 to respond to a user query.

As illustrated in FIG. 2A, the context management system 120 receives a query 214 from a user 212. The context management system 120 uses the model context 208 comprising the model reasoning 219, the session transcript 202, the context summary 204, and/or the meta-summary 206 to condition the LLM 210. More specifically, the context management system 120 uses the LLM 210 to generate a response 216 based on the model context 208.

In some implementations, the context management system 120 uses an LLM to generate context summaries, meta-summaries, and hierarchical summaries (e.g., second-level, third-level, etc. meta-summaries) in the process of multi-turn reasoning. The context management system 120 uses the LLM to generate summaries from model reasoning (and sometimes user input) at different turns by capturing the internal logic, decision paths, and intermediate steps it takes during various stages of a conversation or task. At each turn, the LLM engages in model reasoning, which the context management system 120 can selectively summarize to create lightweight context artifacts. Over multiple turns, the context management system 120 can accumulate context summaries into a structured memory that reflects not only content of model reasoning or user input but also the LLM's thought process. The context management system 120 can use multi-turn context summaries or meta-summaries to recondition the LLM or construct higher-level meta-summaries that reflect how the LLM has approached a task over time. FIG. 2B illustrates the context management system 120 using the LLM to generate different levels of context summaries in the process of multi-turn reasoning in accordance with one or more embodiments of the present disclosure.

As shown in FIG. 2B, the context management system 120 uses the LLM to perform an act 220 of performing a first turn. In the first turn, the LLM 228 can receive session context 226 comprising internal model reasoning (e.g., breaking down a task, inferring assumptions, simulating intermediate steps, etc.). After or as part of the first turn, the context management system 120 uses the LLM 228 to generate a reasoning context summary 230 comprising an abstraction of the turn's key elements, such as task goals, the LLM's decision logic, and other reasoning-relevant information. The reasoning context summary 230 is optimized for reuse or memory storage. In some implementations, the context management system 120 uses the reasoning context summary 230 to replace a portion of model reasoning within model context.

As further shown in FIG. 2B, the context management system 120 uses the LLM 228 to perform an act 222 of performing a second turn. In the second turn, the context management system 120 uses the LLM 228 to take the previously generated reasoning context summary 230 and, optionally, additional context summaries, and generate a meta-summary 232. The meta-summary captures broader themes, cumulative insights, or multi-step reasoning across turns. In some examples, the context management system 120 uses the meta-summary 232 to replace reasoning context summary 230 or a portion of model reasoning within model context for conditioning an LLM.

FIG. 2B further illustrates the context management system 120 utilizing the LLM 228 to perform an act 224 of performing a third turn. In the third turn, the context management system 120 can further task the LLM 228 with generating higher-level meta-summaries (e.g., the second-level meta-summary 234) that further distills decisions that emerges across multiple sets of meta-summaries.

Figure 3A:
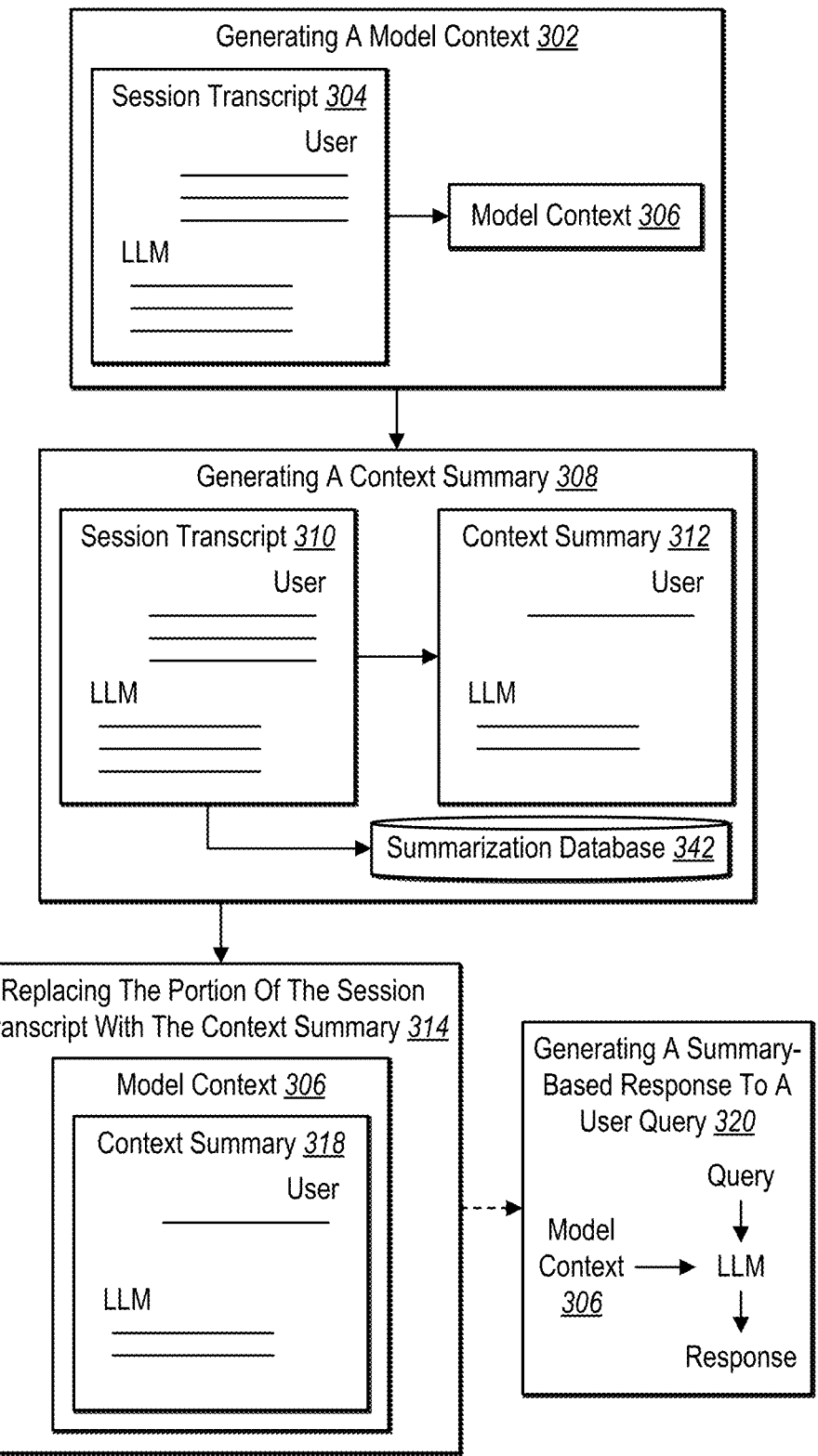
FIGS. 3A-3B illustrate an example overview of the context management system generating a context summary and rematerializing a portion of a context summary in accordance with one or more embodiments of the present disclosure.
Figure 3B:
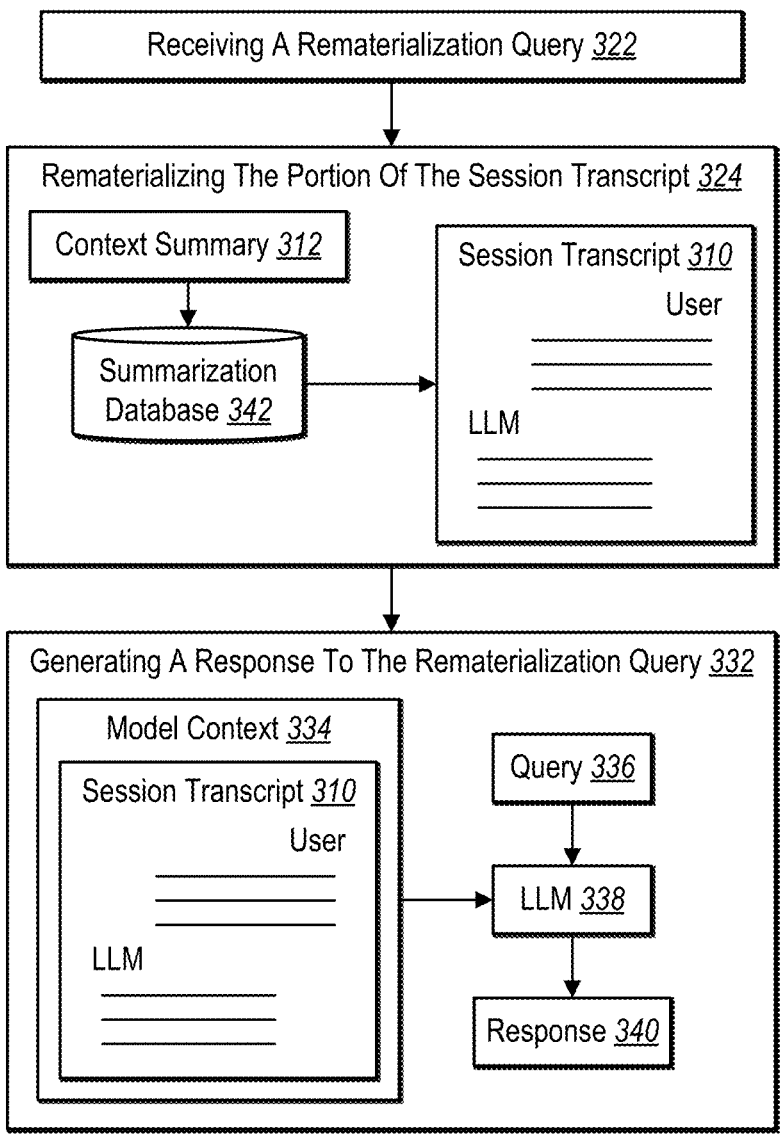

As mentioned, the context management system can utilize an LLM to intelligently decide what and when to summarize from a session transcript or model reasoning and further determine what and when to rematerialize from context summaries. FIGS. 3A-3B illustrate an example overview of the context management system generating a context summary and rematerializing a portion of a session transcript (or model reasoning) in accordance with one or more embodiments of the present disclosure.

As shown in FIG. 3A, the context management system 120 performs an act 302 of generating a model context. The context management system 120 generates, during an ongoing session between a client device and a large language mode, a model context 306 comprising a session transcript 304 for conditioning an LLM for an ongoing session. As mentioned, the session transcript 304 comprises the real, full conversation between the user and the LLM. Additionally, or alternatively, the context management system 120 generates a model context comprising model reasoning.

As mentioned previously, the context management system 120 can flexibly utilize model context between sessions by leveraging compact context summaries that take up significantly less space than full session transcript data or full transcript model reasoning. To illustrate, the context management system 120 can carry the model context 306 comprising the context summary 318 between sessions. Because the context summary 318 condenses key information including user goals, decisions, model reasoning, and prior interactions into a minimal token footprint, the context management system 120 can preserve and reintroduce relevant context from past sessions without exceeding the context window. This allows the LLM to maintain continuity and long-term coherence across otherwise disconnected interactions.

Figure 5:
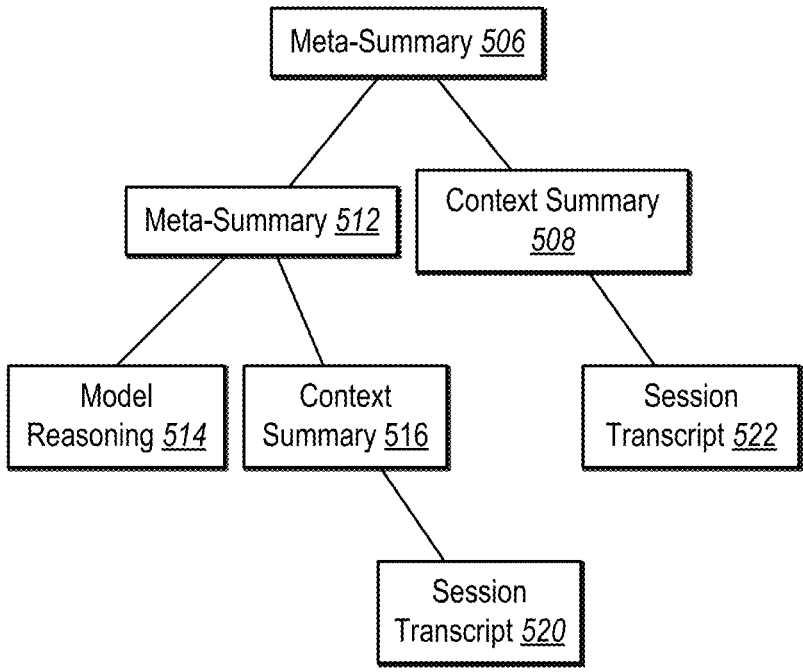
FIG. 5 illustrates the context management system using various types of summarization databases in accordance with one or more implementations of the present disclosure.

As further shown in FIG. 3A, the context management system 120 performs an act 308 of generating a context summary. The context management system 120 uses the LLM during the ongoing session to generate a context summary 312 that summarizes a portion of the session transcript. Additionally, or alternatively, the context summary 312 summaries model reasoning or a portion of model reasoning. As further shown in FIG. 3A, the context management system 120 further stores the portion of the session transcript or the model reasoning within a summarization database 342. In some implementations, the context management system 120 uses the summarization database 342 to maintain a connection between context summaries and their corresponding portions of the session transcript 310. The summarization database 342 can also maintain connections between context summaries and their corresponding portions of model reasoning. FIG. 5 details different storage methods that the context management system 120 can utilize in accordance with one or more embodiments of the present disclosure.

As illustrated in FIG. 3A, the context management system 120 performs an act 314 of replacing the portion of the session transcript with the context summary. More specifically, the context management system 120 replaces, within the model context 306, the portion of the session transcript with the context summary. The context management system 120 can preserve key information for conditioning the LLM while also freeing up space within the model context 306 for new input. This ensures that the LLM maintains continuity without exceeding context limits or sacrificing performance. In some examples, the act 314 comprises replacing the portion of the model reasoning with the context summary.

In some examples, the context management system 120 can perform an optional act 320 of generating a summary-based response to a user query. To illustrate, the context management system 120 uses the context summary 318 to condition the LLM as part of generating a summary-based response to a user query. The context summary 318 comprises a condensed version of conversation history within the session transcript and/or the model reasoning. The context summary 318 informs the LLM of previous discussions, reasoning, and conclusions, which allows the LLM to generate a response that remains contextually aware, even when the original session transcript or the original model reasoning are not within the model context 306.

Figure 6:
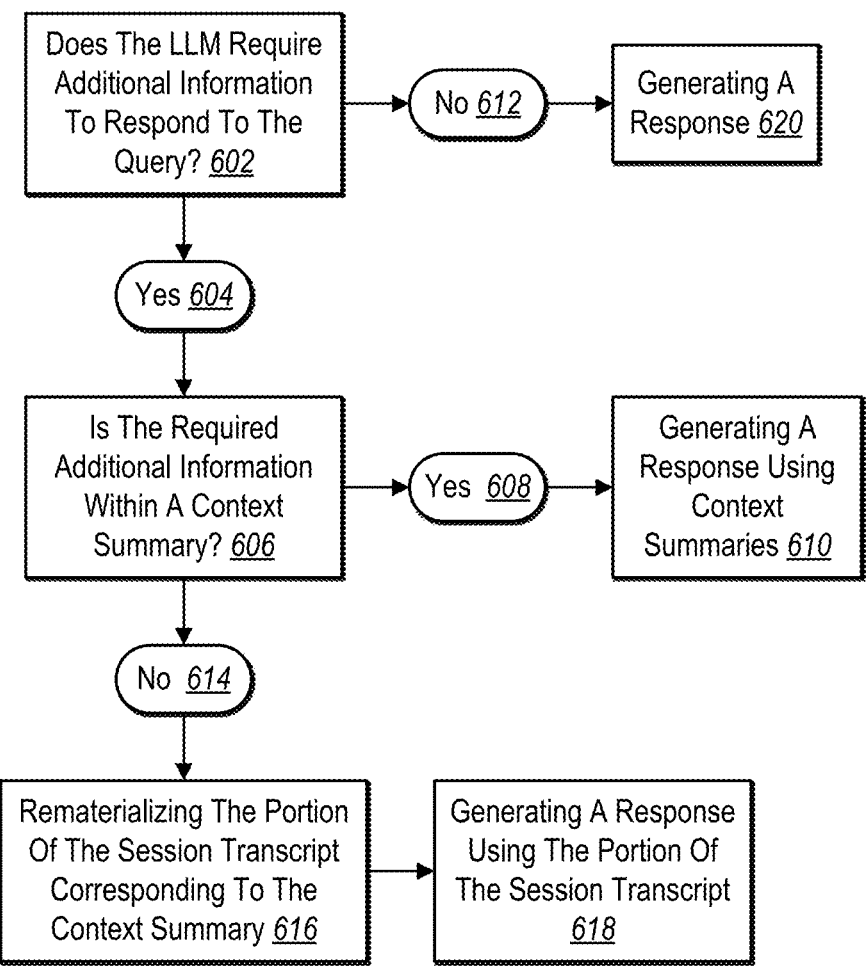
FIG. 6 illustrates a decision flow illustrating internal reasoning process behind a rematerialization prompt in accordance with one or more embodiments of the present disclosure.

As illustrated in FIG. 3B, the context management system 120 further performs an act 322 of receiving a rematerialization query. Generally, the context management system 120 receives a user query and determines that the query is a rematerialization query. More specifically, the context management system 120 utilizes the LLM to determine that the LLM would need the exact text of the session transcript and/or the model reasoning to respond to a query. Accordingly, the context management system 120 designates the query as a rematerialization query. FIG. 6 provides additional details of the context management system 120 determining and responding to a rematerialization query in accordance with one or more implementations.

As shown in FIG. 3B, the context management system 120 performs an act 324 of rematerializing the portion of the session transcript. Based on receiving the rematerialization query, the context management system 120 uses the LLM to modify the model context by rematerializing the portion of the session transcript or the portion of the model reasoning corresponding to the context summary. More specifically, the context management system 120 uses the context summary 312 to access the corresponding portion of the session transcript 310 (and/or the corresponding portion of the model reasoning) stored within the summarization database 342. The context management system 120 further modifies the model context by including the portion of the session transcript 310 and/or the portion of the model reasoning within the model context.

FIG. 3B illustrates the context management system 120 performing an act 332 of generating a response 340 to the rematerialization query 336. In particular, the context management system 120 generates a response 340 to the rematerialization query 336 utilizing the LLM 338 to process the model context 334 comprising the portion of the session transcript 310 and/or the portion of the model reasoning rematerialized from the context summary. More specifically, the context management system 120 reinserts the portion of the session transcript 310 into the model context 334 when more granular information is needed for accurate response generation. The context management system 120 thus restores depth and specificity, allowing the LLM 338 to engage with the original dialogue as if it had never been summarized, thus improving fidelity in multi-turn tasks.

As illustrated by the foregoing discussion, the present disclosure utilizes a variety of terms to describe the features and benefits of the context management system 120. Additional detail is hereafter provided regarding the meaning of these terms as used in this disclosure. For example, as used herein, the term "ongoing session" refers to an active interaction between a user and an LLM. In particular, in an ongoing session, messages are exchanged across multiple turns within a conversational context. During an ongoing session, the LLM maintains awareness of previous messages, allowing the LLM to reference prior inputs and respond coherently. For example, an ongoing session can comprise a conversation between an LLM and a user about a particular topic.

As used herein, the term "rematerialization query" refers to a query that, when received by an LLM, causes the LLM to regenerate a portion of a session transcript or model reasoning. In particular, a rematerialization query triggers an LLM to rematerialize a portion of a session transcript or model reasoning corresponding to a context summary. In some examples, the context management system 120 determines that a query qualifies as a rematerialization query based on determining that a context summary is not sufficient to respond to the query.

Relatedly, as used herein, the term "rematerialize" refers to reconstructing previously compressed information back into its original form. In particular, rematerializing a portion of a session transcript comprises reloading the portion of the session transcript corresponding to a given context summary. Additionally, rematerializing a portion of model reasoning comprises reloading the portion of model reasoning corresponding to a particular context summary. For example, by rematerializing a portion of a session transcript, the LLM can regain access to high-fidelity context when needed.

As used herein, the term "response" refers to output generated by an LLM. More specifically, a response comprises output generated by an LLM in reaction to a user's query or prompt. An LLM produces a response based on provided model context, which can include an immediate query, prior dialogue, system instructions, or any embedded background information.

As indicated above, the context management system 120 provides several advantages over conventional systems. In particular, the context management system 120 provides improved computational efficiency, accuracy, and flexibility over existing systems. The context management system 120 is more computationally efficient than existing systems by proactively compressing information rather than operating with full or overflowing context windows. More specifically, instead of blindly retaining and processing all tokens until an LLM has reached its memory limit, the context management system 120 efficiently summarizes session transcripts and model reasoning. By using the LLM to process context summaries, the context management system 120 reduces the number of tokens the LLM must attend to, which lowers memory usage and inference time while preserving essential information. Furthermore, the context management system 120 selectively rematerializes portions of a session transcript or model reasoning only when needed, which reduces unnecessary computation on low-value tokens.

Additionally, by selectively preserving the most relevant information from a session transcript, the context management system 120 improves accuracy relative to existing systems. In contrast to existing systems that rely on arbitrary truncation when a context window fills up, the context management system 120 summarizes less critical content while maintaining high-salience details. The context management system 120 ensures that the LLM retains access to information most likely to result in correct responses. Furthermore, when the context management system 120 determines that more depth is needed, the context management system 120 rematerializes detailed portions of the session transcript and model reasoning, allowing the LLM to reason over precise facts when necessary.

Furthermore, the context management system 120 is more flexible relative to existing systems. More specifically, the context management system 120 enables fluid preservation and reuse of relevant information across conversations, despite context window limitations. Rather than siloing context within session-bound constraints, the context management system 120 maintains a structured memory of past interactions and reasoning in summarized forms. Accordingly, the context management system 120 can reintegrate context from past conversations into new conversations, allowing the LLM to behave consistently across sessions. This flexibility supports long-term interactions and enables the context management system 120 to adapt to evolving user needs without manual re-entry of context.

Figure 4A:
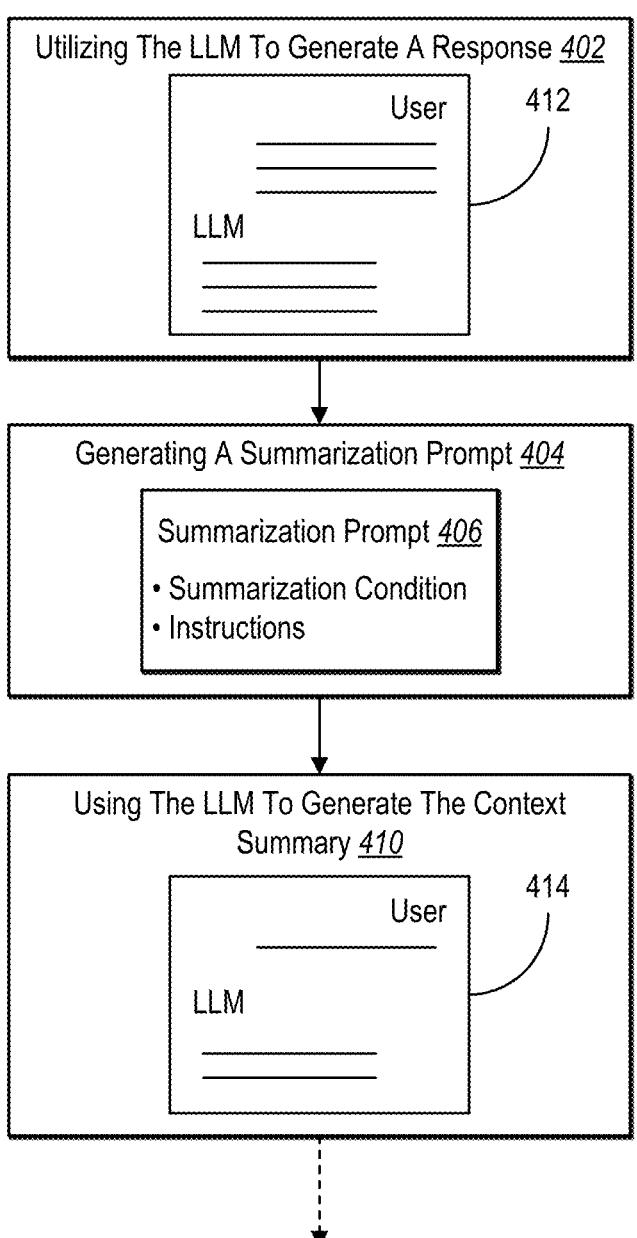
FIGS. 4A-4B illustrate the context management system using an LLM to generate a context summary and a meta-summary in accordance with one or more implementations of the present disclosure.
Figure 4B:
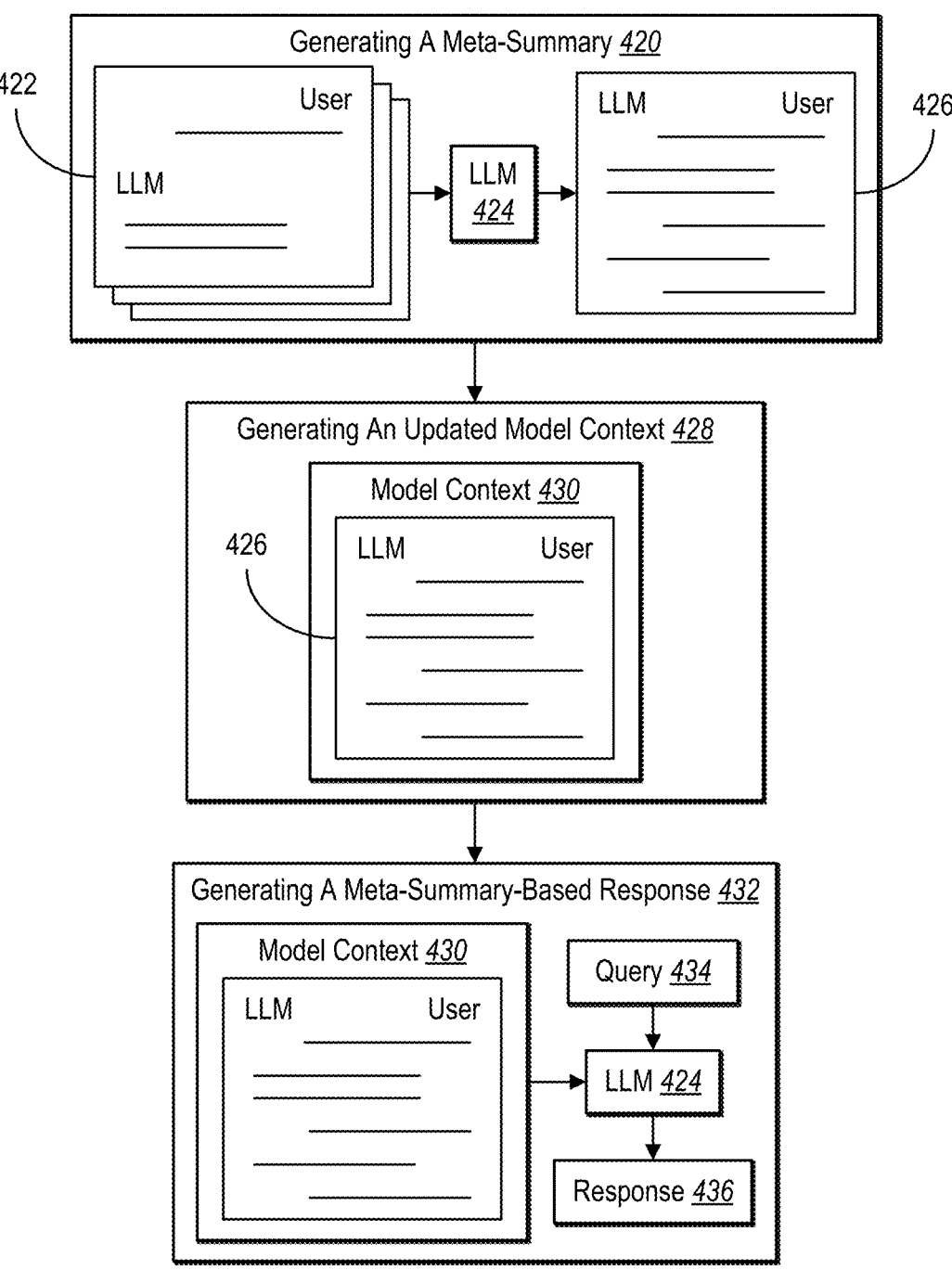

As mentioned, the context management system 120 can utilize an LLM to generate a context summary. FIGS. 4A-4B illustrate the context management system 120 using an LLM to generate a context summary and a meta-summary in accordance with one or more implementations of the present disclosure. FIG. 4A illustrates the context management system 120 using the LLM to generate a context summary, and FIG. 4B illustrates the context management system 120 using the LLM to generate a meta-summary in accordance with some embodiments of the present disclosure.

FIG. 4A illustrates the context management system 120 performing an act 402 of utilizing the LLM to generate a response. As shown, the LLM generates a response to a user query. Each of the user query and the LLM response comprises a message. The user query and the corresponding LLM response together comprise an exchange. In some implementations, the context management system 120 adds the exchange to the model context as part of the session transcript. For example, the exchange between the user and the LLM comprise a portion of a session transcript 412.

As further shown in FIG. 4A, the context management system 120 performs an act 404 of generating a summarization prompt 406. Generally, the context management system 120 generates a summarization prompt that the context management system 120 inputs into the LLM to generate a context summary based on a portion of the session transcript and/or model reasoning. In some examples, the summarization prompt 406 triggers the LLM to (i) determine whether to generate a context summary for specific messages, a portion of the session transcript, and/or corresponding model reasoning and (ii) generate the context summary. In some embodiments, the context management system 120 generates a summarization prompt 406 comprising a summarization condition and instructions to generate the context summary.

As mentioned, the context management system 120 generates the summarization prompt 406 comprising a summarization condition. In some embodiments, the context management system 120 uses the LLM to generate context summaries for a subset of messages within a session transcript while leaving the remaining messages in their original state. Generally, the summarization condition indicates, to the LLM, what messages or exchanges should be summarized. For example, the context management system 120 can determine summarization conditions that include a threshold message length based on word count, character count, or another measure. Additionally, the context management system 120 can determine summarization conditions based on message age, for example, if content is older than a threshold age limit (e.g., 20 minutes, 10 minutes, etc.). The context management system 120 can further determine summarization conditions based on content-based conditions such as when multiple messages have semantic similarity or if a topic for the ongoing session has changed. In some implementations, the context management system 120 determines summarization conditions based on system-level conditions such as if the context window for the model context is full or approaching capacity or if a token threshold for the model context has been met. Additionally, or alternatively, in some examples, the context management system 120 excludes a summarization condition and instead prompts the LLM to generate context summaries for every message.

Similarly, in some embodiments, the context management system 120 performs the act 404 of generating a summarization prompt instructing an LLM to generate a context summary based on model reasoning. The summarization condition indicates, to the LLM, what model reasoning or portions of the model reasoning should be summarized. For example, the summarization condition can include a threshold model reasoning length based on token count, reasoning age, semantic similarity, or other condition.

Additionally, and as illustrated in FIG. 4A, the context management system 120 includes, within the summarization prompt 406, instructions to generate the context summary. The instructions to generate the context summary define the purpose of the context summary and define format or other details for the context summary. For example, the instructions to generate the context summary can include general instructions to maintain important details mentioned in an original user query, the LLM response, the exchange, or the model reasoning. Additionally, the instructions can further include formatting instructions or instructions to index context summaries.

In some embodiments, the context management system 120 uses the LLM to generate dynamic summarization prompts. The context management system 120 leverages the LLM's understanding of conversation flow, user intent, and content structure to create dynamic summarization prompts. Instead of relying on a fixed summarization prompt, the context management system 120 relies on the LLM to dynamically construct prompts that evolve with the structure and purpose of the user-LLM interactions. By using the LLM, the context management system 120 generates more accurate and context-aware context summaries. For example, the context management system 120 can train the LLM to generate dynamic summarization prompts based on a plurality of conversations between users and the LLM, a single conversation between a user and the LLM, or in real time during an ongoing session. Furthermore, the context management system 120 can train the LLM to generate dynamic summarization prompts based on a single or multiple steps of model reasoning.

In some embodiments, instead of performing the act 404 of generating a summarization prompt every time the LLM generates a response, the context management system 120 inputs a fixed or dynamic summarization prompt into the LLM. For example, the context management system 120 can submit a previously generated fixed or dynamic summarization prompt to the LLM. The context management system 120 can periodically perform the act 404 of generating the summarization prompt at predetermined intervals. For instance, the context management system 120 can generate a new summarization prompt after a set number of messages have been exchanged between the user and the LLM. In another example, the context management system 120 generates a summarization prompt after a predetermined number of sessions.

As further illustrated in FIG. 4A, the context management system 120 performs an act 410 of using the LLM to generate the context summary. The context management system 120 uses the LLM to process the summarization prompt and the session transcript and/or model reasoning. To illustrate, the context management system 120 passes the summarization prompt 406 into the LLM. The LLM determines whether summarization conditions are met and follows instructions to generate a context summary. For example, and as shown in FIG. 4A, the context management system 120 uses the LLM to generate a context summary 414 based on the portion of the session transcript 412.

In some embodiments, the context management system 120 utilizes the LLM to generate a context summary asynchronously. In such examples, the context management system 120 prompts the LLM to generate the context summary immediately after generating a response. As a result, the LLM generates the context summary while the user is reading the previous response and potentially writing an additional query. By asynchronously generating context summaries, the LLM can process inputs separately from preparing context summaries, reducing latency in real-time use.

Furthermore, in some embodiments, the context management system 120 batches user queries and LLM responses before utilizing the LLM to generate context summaries.

Rather than summarizing each message (i.e., user query or LLM response) individually, the context management system 120 can wait until a batch of exchanges is complete before prompting the LLM to produce a context summary. For instance, the context management system 120 can use a predetermined number of exchanges before generating context summaries corresponding to those exchanges. Similarly, the context management system 120 batches model reasoning steps before generating context summaries based on multiple model reasoning steps.

Optionally, in some embodiments, the context management system 120 uses the LLM to generate a meta-summary. FIG. 4B illustrates the context management system 120 generating a meta-summary and a meta-summary-based response in accordance with one or more embodiments of the present disclosure.

FIG. 4B illustrates the context management system 120 performing an act 420 of generating a meta-summary. In particular, the context management system 120 generates, using an LLM 424, a meta-summary 426 summarizing one or more context summaries 422 within the model context. More particularly, the context management system 120 assembles the one or more context summaries 422 that represent condensed versions of portions of a session transcript and/or model reasoning. The context management system 120 feeds the one or more context summaries 422 (and/or model reasoning) into the LLM 424 together with a summarization prompt. As mentioned previously, the summarization prompt instructs the LLM 424 to synthesize the themes, outcomes, goals, or other features across the one or more context summaries 422. The LLM produces the meta-summary 426, which serves as a higher-level abstraction of the ongoing session. While not shown in FIG. 4B, the context management system 120 can generate higher level meta-summaries, e.g., a summary of a meta-summary. In this way, the context management system 120 can have access to an infinite context size as the entirety of the context remains available through rematerialization, and less relevant portions of the context are included in one or more layers of nested context summaries.

As illustrated in FIG. 4B, the context management system 120 performs an act 428 of generating an updated model context. In particular, the context management system 120 generates an updated model context 430 by replacing the one or more context summaries originally in the model context with the meta-summary 426. As a result, the context management system 120 can further reduce the number of conversation-based tokens within the model context while still maintaining key concepts.

FIG. 4B further illustrates the context management system 120 performing an act 432 of generating a meta-summary-based response. The context management system 120 generates a response 436 to a query 434 using the LLM 424 to process the updated model context 430 containing the meta-summary 426. In some embodiments, based on receiving a rematerialization query, the context management system 120 can rematerialize context summaries, model reasoning, or portions of the session transcript based on receiving a rematerialization query.

As mentioned, the context management system 120 can generate and maintain a summarization database. FIG. 5 illustrates the context management system 120 using various types of summarization databases in accordance with one or more implementations of the present disclosure. For example, FIG. 5 illustrates a linear table index 502 and a tree-based hierarchical structure 504.

FIG. 5 illustrates the context management system 120 utilizing the linear table index 502 to store and order context summaries and their corresponding session transcripts. The linear table index 502 is a simple data structure in which each row associates an index number (e.g., 0, 1, 2, etc.) with a context summary and a session transcript. In such a system, the context management system 120 processes the session transcript in portions and assigns each portion a unique index. For example, and as illustrated, the context management system 120 processes the session transcript based on messages where each query or response corresponds with a context summary and an index.

FIG. 5 further illustrates the context management system 120 utilizing a tree-based hierarchical structure 504 to organize data within a summarization database. In the tree-based hierarchical structure 504 for organizing conversational memory and model reasoning, the root node 506 represents the most abstracted form of information. In particular, the root node 506 captures overarching themes and multi-session conclusions derived from interactions and reasonings of an LLM. As shown in FIG. 5, the root node 506 comprises a meta-summary or a higher-level meta-summary.

As shown in FIG. 5, from the root node 506, the tree branches downward into a meta-summary node 512. The meta-summary node 512 summarizes a portion of session context, such as interactions or model reasoning. As a branch node, the meta-summary node 512 provides mid-level abstractions that connect high-level memory to more granular dialogue and reasoning history.

As further illustrated in FIG. 5, beneath the meta-summary node 512 and the root node 506 are the context summary node 516 and the context summary node 508. The context summary nodes summarize smaller, well-defined portions of session transcript or steps of model reasoning.

The context summary node 508 and the context summary node 516 are linked to leaf nodes at the base of the tree comprising session transcript node 522 and session transcript 520. As shown, an additional leaf node, the model reasoning node 514, is linked directly to the meta-summary node 512. As illustrated in FIG. 5, the leaf nodes contain either original session transcript segments or model reasoning traces that produced context summaries or helped produce meta-summaries. This hierarchical design enables the context management system 120 to flexibly traverse from high-level memory down to specific reasoning or dialogue details.

The linear table index 502 and the tree-based hierarchical structure 504 allow quick access to both high-level and detailed representations of a conversation. Generally, the summarization database supports efficient context management by enabling the LLM to operate on lightweight summaries during active inference while retaining the ability to restore full session transcript detail if a rematerialization query is received.

Based on receiving a rematerialization query, the context management system 120 traverses the summarization database to retrieve content relevant to the rematerialization query. To illustrate, the context management system 120 can traverse the linear table index 502 by scanning through indexed entries in order to identify the context summary that matches the rematerialization query. Once the context management system 120 identifies the match, the context management system 120 retrieves the associated portion of the session transcript.

The context management system 120 can also traverse the tree-based hierarchical structure 504 to retrieve a portion of a session transcript. The context management system 120 navigates the tree-based hierarchical structure 504 using depth-first or breadth-first search, following parent-child relationships to locate the node containing a relevant context summary. Upon identifying the appropriate node, the context management system 120 rematerializes the associated portion of the session transcript.

Based on identifying the relevant context summary and the corresponding portion of the session transcript, the context management system 120 can determine to rematerialize the entire portion of the session transcript or a segment of it. For example, the context management system 120 can reinsert the entire portion of the session transcript in the model context, replacing the context summary. In some embodiments, rather than entirely replacing the context summary within the model context, the context management system 120 can simply augment the current context summary with more detail based on the session transcript. Furthermore, in some embodiments, the context management system 120 determines to rematerialize only a segment of the portion of the session transcript. In particular, the context management system 120 can identify the most relevant segment of the portion of the session transcript. Based on identifying the most relevant segment, the context management system 120 includes the segment of the portion of the session transcript within the model context.

In some embodiments, the context management system 120 uses any type of indexing system to associate context summaries with their corresponding portions of the session transcript for efficient retrieval. In some implementations, the context management system 120 does not rely on an explicit indexing system at all. For structured implementations, the context management system 120 can rely on a linear index (e.g., the linear table index 502), a hierarchical index (e.g., the tree-based hierarchical structure 504). Additionally, or alternatively, the context management system 120 uses metadata tagging that relies on timestamps, message IDs, or topic labels to maintain associations between context summaries and portions of the session transcript without requiring a formal index. In yet other implementations, the context management system 120 resolves associations dynamically at runtime by matching embeddings, semantic content, or summary hashes. Such systems allow the context management system 120 to support both lightweight and complex memory strategies.

In some embodiments, the context management system 120 generates a rematerialization prompt to evaluate whether a query comprises a rematerialization query. FIG. 6 illustrates a decision flow illustrating internal reasoning process behind a rematerialization prompt in accordance with one or more embodiments of the present disclosure.

In some implementations, the context management system 120 generates a rematerialization prompt and feeds the LLM the rematerialization prompt. For example, the context management system 120 determines that the LLM has received a query from a client device. Based on receiving the query, the context management system 120 generates and/or feeds a rematerialization prompt to the LLM. The rematerialization prompt instructs the LLM to determine whether to rematerialize a portion of a session transcript. The LLM processes the user query and the rematerialization prompt to determine whether the portion of the session transcript is required to generate a response to the user query.

In some implementations, the context management system 120 generates a rematerialization prompt that instructs the LLM to determine whether to rematerialize a portion of the session transcript. FIG. 6 illustrates an example decision flow that guides a rematerialization prompt. As shown in FIG. 6, the decision flow begins with evaluation 602 whether the LLM requires additional information to respond to the query. Based on the LLM making the determination 612 that additional information is not required to respond to the query, the LLM performs act 620 of generating a response.

As illustrated in FIG. 6, based on the LLM making a determination 604 that the LLM requires additional information to respond to a query, the LLM proceeds to evaluation 606 determining whether the required additional information is within a context summary. Based on making determination 608 that the required additional information is within a context summary, the LLM performs an act 610 of generating a response using context summaries. In particular, the LLM processes the model context comprising the context summaries to generate a response.

As further illustrated in FIG. 6, based on the LLM's determination 614 that the required additional information is not within a context summary, the context management system 120 performs an act 616 of rematerializing the portion of the session transcript corresponding to the context summary. In some embodiments, as part of making the determination 614, the LLM further evaluates whether the additional required information is within the session transcript or a portion of the session transcript. More specifically, in some implementations, as part of the rematerialization prompt, the context management system 120 instructs the LLM to return the location of the relevant portion(s) of the session transcript within the summarization database. For example, the LLM can report, to the context management system 120, the index or other location of the portion or portions of the session transcript. In some examples, the act 616 comprises rematerializing a portion of model reasoning corresponding to the context summary.

Furthermore, as part of performing the act 616 of rematerializing the portion of the session transcript, the context management system 120 retrieves the portion(s) of the session transcript from the summarization database. The context management system 120 further inserts the portion(s) of the session transcript into the model context. In some embodiments, the context management system 120 further removes the corresponding context summary from the model context.

As shown in FIG. 6, the context management system 120 further performs an act 618 of generating a response using the portion of the session transcript. More specifically, the context management system 120 uses the LLM to generate a response to the query by processing the user query together with the model context comprising the portion of the session transcript.

FIGS. 1-6, the corresponding text, and the examples provide several different systems and methods for using an LLM to generate responses based on context summaries or rematerialized portions of session transcripts in accordance with one or more embodiments. In addition to the foregoing, implementations can also be described in terms of flowcharts comprising acts steps in a method for accomplishing a particular result. For example, FIG. 7 illustrates an example series of acts 700 for generating a response to a rematerialization query using an LLM to process a portion of a session transcript in accordance with one or more embodiments of the present disclosure.

FIG. 7 illustrates the context management system 120 performing an act 702 of generating a model context comprising a session transcript. In particular, the act 702 comprises generating, during an ongoing session between a client device and a large language model, a model context comprising a session transcript for conditioning the large language model for the ongoing session.

As illustrated in FIG. 7, the series of acts 700 includes an act 704 of generating a context summary. In particular, the act 704 comprises generating, using the large language model during the ongoing session, a context summary summarizing a portion of the session transcript from the ongoing session with the large language model.

As illustrated in FIG. 7, the series of acts 700 includes an act 706 of replacing the portion of the session transcript with the context summary. In particular, the act 706 comprises replacing, within the model context, the portion of the session transcript with the context summary.

As illustrated in FIG. 7, the context management system 120 performs an act 708 of receiving a rematerialization query triggering the LLM to rematerialize the portion of the session transcript. In particular, the act 708 comprises receiving, from the client device, a rematerialization query that triggers the large language model to modify the model context by rematerializing the portion of the session transcript corresponding to the context summary.

FIG. 7 illustrates the context management system 120 performing an act 710 of generating a response to the rematerialization query using the LLM to process the portion of the session transcript. In particular, the act 710 comprises generating a response to the rematerialization query utilizing the large language model to process the model context comprising the portion of the session transcript rematerialized from the context summary.

The series of acts 700 further comprises additional acts of generating a summarization prompt comprising a summarization condition and instructions to generate the context summary; and using the large language model to generate the context summary based on the summarization prompt. Additionally, in some embodiments, the additional act further comprises determining that the summarization condition is satisfied by at least one of: determining that a context window for the model context is full; determining that a token threshold for the model context has been met; determining that content is older than a threshold age limit; or determining that a topic for the ongoing session has changed.

In some embodiments, the series of acts 700 further comprises removing the portion of the session transcript from the model context; and adding the context summary to the model context. Additionally, the series of acts 700 can further comprise receiving, from the client device, an additional query; and generating a summary-based response to the additional query utilizing the large language model to process the model context comprising the context summary.

In one or more embodiments, the series of acts 700 further comprises generating context summaries that summarize portions of the session transcript; associating the context summaries with corresponding portions of the session transcript; and storing the context summaries and their corresponding portions of the session transcript in a summarization database.

In some embodiments, the series of acts 700 further comprises generating, during the ongoing session, a reasoning model context comprising model reasoning for conditioning the large language model; generating, using the large language model, a reasoning context summary summarizing a portion of the model reasoning from the ongoing session with the large language model; replacing, within the reasoning model context, the portion of the model reasoning with the reasoning context summary; and generating a response to a user query utilizing the large language model to process the model context comprising the reasoning context summary.

In one or more implementations, the series of acts 700 further comprises storing, within a tree-based hierarchical structure within a summarization database, the context summary within a parent node; and storing, within the tree-based hierarchical structure within the summarization database, the portion of the session transcript within a child node.

In one or more embodiments, the series of acts 700 includes generating, using the large language model and during the ongoing session, a meta-summary summarizing one or more context summaries within the model context, wherein the one or more context summaries comprises the context summary; generating an updated model context by replacing the one or more context summaries with the meta-summary; receiving, from the client device, a query; and generating a meta-summary-based response to the query using the large language model to process the updated model context comprising the meta-summary.

Additionally, in some embodiments, the series of acts 700 further comprises receiving, from the client device, a query; generating a rematerialization prompt instructing the large language model to determine whether the portion of the session transcript is required to respond to the query; and determining, using the large language model and the rematerialization prompt, that the query qualifies as the rematerialization query.

Figure 8:
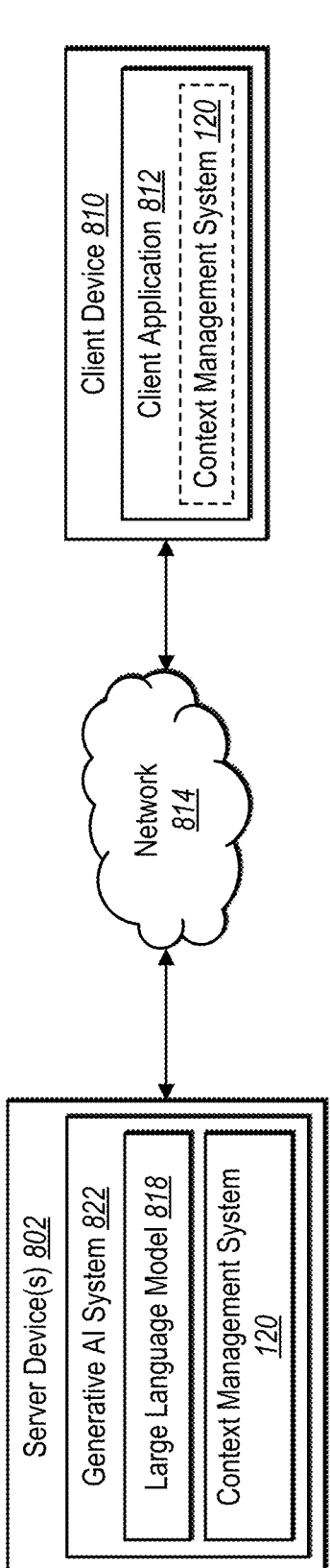
FIG. 8 illustrates a schematic diagram of an example system environment for implementing a context management system in accordance with one or more implementations.

FIG. 8 illustrates a schematic diagram of an example system environment for implementing a context management system 120 in accordance with one or more implementations. An overview of the context management system 120 is described in relation to FIG. 8.

As shown, the environment includes server device(s) 802, a client device 810, and a network 814. Each of the components of the environment can communicate via the network 814, and the network 814 may be any suitable network over which computing devices can communicate. Example networks are discussed in more detail below in relation to FIGS. 9-10.

As mentioned above, the example environment includes a client device 810. The client device 810 can be one of a variety of computing devices, including a smartphone, a tablet, a smart television, a desktop computer, a laptop computer, a virtual reality device, an augmented reality device, or another computing device as described in relation to FIGS. 9-10. The client device 810 can communicate with the server device(s) 802 via the network 814. For example, the client device 810 can receive user input from a user interacting with the client device 810 (e.g., via the client application 812) to, for instance, interact with a generative AI system 822 located on the server device(s) 802. In addition, the context management system 120 on the server device(s) 802 can receive information relating to various interactions with user interface elements based on the input received by the client device 810.

As shown, the client device 810 can include a client application 812. In particular, the client application 812 may be a web application, a native application installed on the client device 810 (e.g., a mobile application, a desktop application, etc.), or a cloud-based application where all or part of the functionality is performed by the server device(s) 802. Based on instructions from the client application 812, the client device 810 can present or display information, including a dialogue between a user and the large language model 818.

As illustrated in FIG. 8, the example environment also includes the server device(s) 802. The server device(s) 802 may generate, track, store, process, receive, search, communicatively link, and transmit electronic data, such as digital content (e.g., content items), datasets, messages, searchable data, pages of data, prompts, interface elements, searches, browsing activity, browsing data, interactions with interface elements, interactions with selectable connector suggestions, and/or interactions between user accounts or client devices and the generative AI system 822. For example, the server device(s) 802 may receive data from the client device 810 in the form of a user prompt or query. Additionally, the device(s) 802 can process inputs through the large language model 818 and return generated outputs such as text, summaries, code, or images. In some embodiments, the device(s) 802 manage auxiliary tasks such as session tracking, context management, content filtering, and integration with databases or external tools. Indeed, the server device(s) 802 can communicate with the client device 810 to send and/or receive data via the network 814. In some implementations, the server device(s) 802 comprise(s) a distributed server where the server device(s) 802 include(s) a number of server devices distributed across the network 814 and located in different physical locations. The server device(s) 802 can comprise one or more content servers, application servers, communication servers, web-hosting servers, machine learning server, and other types of servers.

As shown in FIG. 8, the server device(s) 802 can also include the context management system 120 as part of a generative AI system 822. The generative AI system 822 can communicate with the client device 810 to perform various functions associated with the client application 812 such as receiving text prompts or queries and generating outputs using the large language model 818. The generative AI system 822 ingests structured or unstructured input data and uses the large language model 818 to intelligently produce outputs. The generative AI system 822 can further interface with backend infrastructure to manage contextual state, retrieve relevant documents, and update session-specific information. In some examples, the generative AI system 822 interacts with a cloud storage module to access user-linked content items or synchronize generated outputs with external third-party applications.

Although FIG. 8 depicts the context management system 120 located on the server device(s) 802, in some implementations, the context management system 120 may be implemented by (e.g., located entirely or in part on) one or more other components of the environment. For example, the context management system 120 may be implemented by the client device 810 and/or a third-party device. For example, the client device 810 can download all or part of the context management system 120 for implementation independent of, or together with, the server device(s) 802. In some embodiments, the context management system 120 is implemented as a plug-in or modular extension associated with the large language model 818.

In some implementations, though not illustrated in FIG. 8, the environment may have a different arrangement of components and/or may have a different number or set of components altogether. For example, the client device 810 may communicate directly with the context management system 120 bypassing the network 814. As another example, the environment can include a database located external to the server device(s) 802 (e.g., in communication via the network 814) or located on the server device(s) 802, on third-party servers, and/or on the client device 810.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media. Non-transitory computer-readable storage media (devices) includes RAM, ROM, EEPROM, solid state drives ("SSDs") (e.g., based on RAM), Flash memory, phase-change memory ("PCM"), or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network computers, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
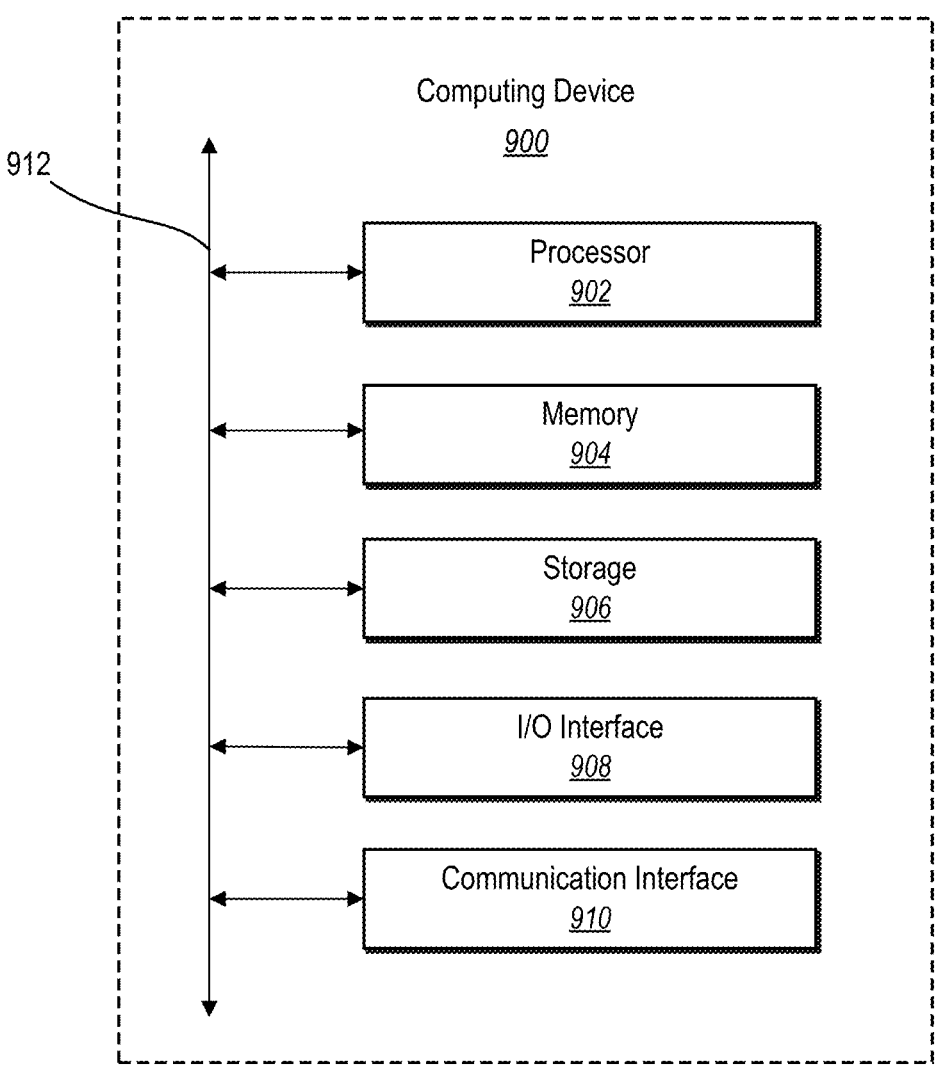
FIG. 9 illustrates a block diagram of an exemplary computing device in accordance with one or more embodiments.

FIG. 9 illustrates a block diagram of exemplary computing device 900 (e.g., the server device(s) 802 and/or the client device 810) that may be configured to perform one or more of the processes described above. One will appreciate that server device(s) 802 and/or the client device 810 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other implementations. Furthermore, in certain implementations, computing device 900 can include fewer components than those shown in FIG. 9. Components of computing device 900 shown in FIG. 9 will now be described in additional detail.

In particular implementations, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular implementations, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular implementations, storage device 906 is non-volatile, solid-state memory. In other implementations, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
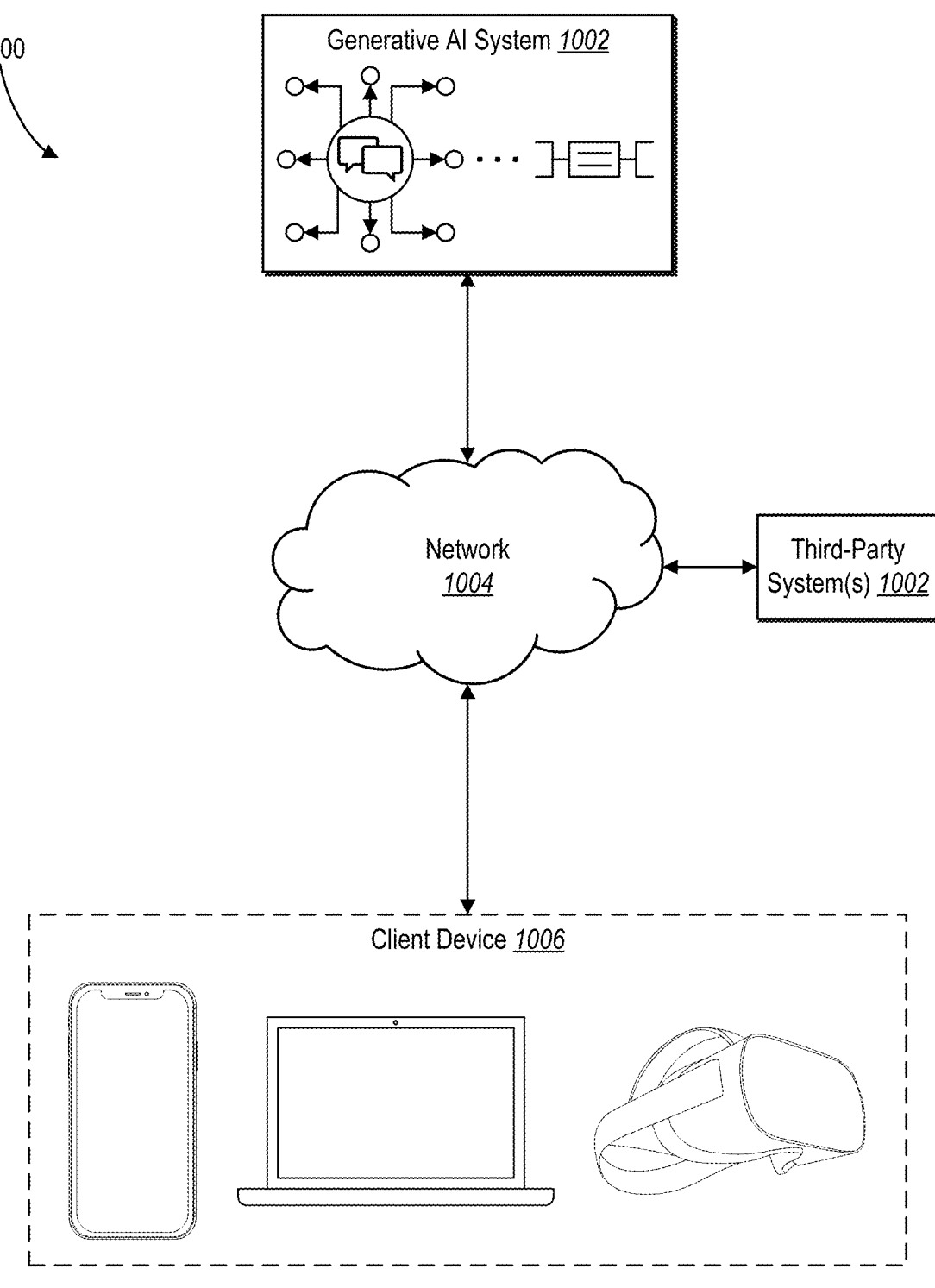
FIG. 10 illustrates a networking environment of a context management system in accordance with one or more embodiments.

FIG. 10 is a schematic diagram illustrating environment 1000 within which one or more implementations of the context management system 120 can be implemented. For example, the context management system 120 may be part of a generative AI system 1002 (e.g., the generative AI system 100 or the generative AI system 822). Generative AI system 1002 may generate, store, manage, receive, and send digital content (such as digital content items). For example, generative AI system 1002 may send and receive digital content to and from client devices 1006 by way of network 1004. In particular, generative AI system 1002 can store and manage a collection of digital content. Generative AI system 1002 can manage the sharing of digital content between computing devices associated with a plurality of users. For instance, generative AI system 1002 can facilitate a user sharing a digital content with another user of generative AI system 1002.

In particular, generative AI system 1002 can manage synchronizing digital content across multiple client devices 1006 associated with one or more users. For example, a user may edit digital content using client device 1006. The generative AI system 1002 can cause client device 1006 to send the edited digital content to generative AI system 1002. Generative AI system 1002 then synchronizes the edited digital content on one or more additional computing devices.

In addition to synchronizing digital content across multiple devices, one or more implementations of generative AI system 1002 can provide an efficient storage option for users that have large collections of digital content. For example, generative AI system 1002 can store a collection of digital content on generative AI system 1002, while the client device 1006 only stores reduced-sized versions of the digital content. A user can navigate and browse the reduced-sized versions (e.g., a thumbnail of a digital image) of the digital content on client device 1006. In particular, one way in which a user can experience digital content is to browse the reduced-sized versions of the digital content on client device 1006.

Another way in which a user can experience digital content is to select a reduced-size version of digital content to request the full- or high-resolution version of digital content from generative AI system 1002. In particular, upon a user selecting a reduced-sized version of digital content, client device 1006 sends a request to generative AI system 1002 requesting the digital content associated with the reduced-sized version of the digital content. Generative AI system 1002 can respond to the request by sending the digital content to client device 1006. Client device 1006, upon receiving the digital content, can then present the digital content to the user. In this way, a user can have access to large collections of digital content while minimizing the amount of resources used on client device 1006.

Client device 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access generative AI system 1002.

As illustrated, the generative AI system 1002 communicates with third-party system(s) 1008 by way of the network 1004. For example, the generative AI system 1002 generates computer code or scripts for execution by the third-party system(s) 1008 as part of generating an output. In some cases, the generative AI system 1002 integrates subcomponents or features of the third-party system(s) 1008 using APIs or other integrations. The third-party system(s) 1008 can include systems housed and operated on servers separate from the generative AI system 1002, such as data management systems, calendaring systems, social networking systems, search engine systems, and/or computer other systems.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, during an ongoing session between a client device and a large language model, a model context comprising a session transcript for conditioning the large language model for the ongoing session;
generating, using the large language model during the ongoing session, a context summary summarizing a portion of the session transcript from the ongoing session with the large language model;
replacing, within the model context, the portion of the session transcript with the context summary;
receiving, from the client device, a rematerialization query that triggers the large language model to modify the model context by rematerializing the portion of the session transcript corresponding to the context summary;
generating a response to the rematerialization query utilizing the large language model to process the model context comprising the portion of the session transcript rematerialized from the context summary; and
after generating the response to the rematerialization query:
removing the portion of the session transcript from the model context; and
adding the context summary to the model context.

2. The computer-implemented method of claim 1, further comprising:
generating a summarization prompt comprising a summarization condition and instructions to generate the context summary; and
using the large language model to generate the context summary based on the summarization prompt.

3. The computer-implemented method of claim 2, further comprising determining that the summarization condition is satisfied by at least one of:
determining that a context window for the model context is full;
determining that a token threshold for the model context has been met;
determining that content is older than a threshold age limit; or
determining that a topic for the ongoing session has changed.

4. The computer-implemented method of claim 1, further comprising rematerializing the portion of the session transcript by:
inserting the portion of the session transcript into the model context; and
removing the context summary from the model context.

5. The computer-implemented method of claim 1, further comprising:
receiving, from the client device, an additional query; and
generating a summary-based response to the additional query utilizing the large language model to process the model context comprising the context summary.

6. The computer-implemented method of claim 1, further comprising:
generating context summaries that summarize portions of the session transcript;
associating the context summaries with corresponding portions of the session transcript; and
storing the context summaries and their corresponding portions of the session transcript in a summarization database.

7. The computer-implemented method of claim 1, further comprising:
generating, during the ongoing session, a reasoning model context comprising model reasoning for conditioning the large language model;
generating, using the large language model, a reasoning context summary summarizing a portion of the model reasoning from the ongoing session with the large language model;
replacing, within the reasoning model context, the portion of the model reasoning with the reasoning context summary; and
generating a response to a user query utilizing the large language model to process the model context comprising the reasoning context summary.

8. The computer-implemented method of claim 1, further comprising:
storing, within a tree-based hierarchical structure within a summarization database, the context summary within a parent node; and

29 storing, within the tree-based hierarchical structure within the summarization database, the portion of the session transcript within a child node.

9. The computer-implemented method of claim 1, further comprising:

generating, using the large language model and during the ongoing session, a meta-summary summarizing one or more context summaries within the model context, wherein the one or more context summaries comprises the context summary;

generating an updated model context by replacing the one or more context summaries with the meta-summary;

receiving, from the client device, a query; and generating a meta-summary-based response to the query using the large language model to process the updated model context comprising the meta-summary.

10. The computer-implemented method of claim 1, further comprising:

receiving, from the client device, a query;

generating a rematerialization prompt instructing the large language model to determine whether the portion of the session transcript is required to respond to the query; and determining, using the large language model and the rematerialization prompt, that the query qualifies as the rematerialization query.

11. A system comprising:

at least one processor; and a non-transitory computer readable medium comprising instructions that, when executed by the at least one processor, cause the system to:

generate, during an ongoing session between a client device and a large language model, a model context comprising a session transcript for conditioning the large language model for the ongoing session;

generate, using the large language model during the ongoing session, a context summary summarizing a portion of the session transcript from the ongoing session with the large language model;

replace, within the model context, the portion of the session transcript with the context summary;

receive, from the client device, a rematerialization query that triggers the large language model to modify the model context by rematerializing the portion of the session transcript corresponding to the context summary;

generate a response to the rematerialization query utilizing the large language model to process the model context comprising the portion of the session transcript rematerialized from the context summary; and after generating the response to the rematerialization query:

remove the portion of the session transcript from the model context; and add the context summary to the model context.

12. The system of claim 11, further comprising instructions that, when executed by the at least one processor, cause the system to:

receive, from the client device, a query;

generate a rematerialization prompt instructing the large language model to determine whether the portion of the session transcript is required to respond to the query; and determine, using the large language model and the rematerialization prompt, that the query qualifies as the rematerialization query.

13. The system of claim 11, further comprising instructions that, when executed by the at least one processor, cause the system to:

generate, using the large language model and during the ongoing session, a meta-summary summarizing one or more context summaries within the model context, wherein the one or more context summaries comprises the context summary;

generate an updated model context by replacing the one or more context summaries with the meta-summary;

receive, from the client device, a query; and generate a meta-summary-based response to the query using the large language model to process the updated model context comprising the meta-summary.

14. The system of claim 11, further comprising instructions that, when executed by the at least one processor, cause the system to:

generate a summarization prompt comprising a summarization condition and instructions to generate the context summary; and use the large language model to generate the context summary based on the summarization prompt.

15. The system of claim 14, further comprising instructions that, when executed by the at least one processor, cause the system to determine that the summarization condition is satisfied by at least one of:

determining that a context window for the model context is full;

determining that a token threshold for the model context has been met;

determining that content is older than a threshold age limit; or determining that a topic for the ongoing session has changed.

16. A non-transitory computer readable medium comprising instructions that, when executed by at least one processor, cause the at least one processor to:

generate, during an ongoing session between a client device and a large language model, a model context comprising a session transcript for conditioning the large language model for the ongoing session;

generate, using the large language model during the ongoing session, a context summary summarizing a portion of the session transcript from the ongoing session with the large language model;

replace, within the model context, the portion of the session transcript with the context summary;

receive, from the client device, a rematerialization query that triggers the large language model to modify the model context by rematerializing the portion of the session transcript corresponding to the context summary;

generate a response to the rematerialization query utilizing the large language model to process the model context comprising the portion of the session transcript rematerialized from the context summary; and after generating the response to the rematerialization query:

remove the portion of the session transcript from the model context; and add the context summary to the model context.

17. The non-transitory computer readable medium of claim 16, further comprising instructions that, when executed by the at least one processor, cause the at least one processor to rematerialize the portion of the session transcript by:

inserting the portion of the session transcript into the model context; and removing the context summary from the model context.

18. The non-transitory computer readable medium of claim 16, further comprising instructions that, when executed by the at least one processor, cause the at least one processor to:

receive, from the client device, an additional query; and generate a summary-based response to the additional query utilizing the large language model to process the model context comprising the context summary.

19. The non-transitory computer readable medium of claim 16, further comprising instructions that, when executed by the at least one processor, cause the at least one processor to:

generate, during the ongoing session, a reasoning model context comprising model reasoning for conditioning the large language model;

generate, using the large language model, a reasoning context summary summarizing a portion of the model reasoning from the ongoing session with the large language model;

replace, within the reasoning model context, the portion of the model reasoning with the reasoning context summary; and generate a response to a user query utilizing the large language model to process the model context comprising the reasoning context summary.

20. The non-transitory computer readable medium of claim 16, further comprising instructions that, when executed by the at least one processor, cause the at least one processor to:

generate context summaries that summarize portions of the session transcript;

associate the context summaries with corresponding portions of the session transcript; and store the context summaries and their corresponding portions of the session transcript in a summarization database.

* * * * *